(12) United States Patent
Lazaridis et al.

(10) Patent No.: US 9,684,378 B2
(45) Date of Patent: Jun. 20, 2017

(54) ELECTRONIC DEVICE AND METHOD OF DISPLAYING INFORMATION IN RESPONSE TO A GESTURE

(75) Inventors: Mihal Lazaridis, Waterloo (CA); Daniel Tobias Rydenhag, Gothenburg (SE); Donald James Lindsay, Mountainview, CA (US); Alistair Robert Hamilton, Sammamish, WA (US); Robert Simon Lessing, Malmö (SE); Jason Tyler Griffin, Kitchener (CA); Joseph Eytan Benedek, Thornhill (CA); Todd Andrew Wood, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 469 days.

(21) Appl. No.: 13/618,818

(22) Filed: Sep. 14, 2012

(65) Prior Publication Data

US 2013/0117718 A1 May 9, 2013

Related U.S. Application Data

(63) Continuation of application No. 13/309,227, filed on Dec. 1, 2011, which is a continuation-in-part of application No. 12/985,600, filed on Jan. 6, 2011, and a continuation-in-part of application No. 13/036,186, filed on Feb. 28, 2011.

(51) Int. Cl.
| | |
|---|---|
| *G06F 3/00* | (2006.01) |
| *G06F 3/01* | (2006.01) |
| *G06F 3/0488* | (2013.01) |
| *H04M 1/725* | (2006.01) |

(52) U.S. Cl.
CPC .......... *G06F 3/017* (2013.01); *G06F 3/04883* (2013.01); *H04M 1/72547* (2013.01)

(58) Field of Classification Search
USPC .......................... 715/836, 838; 345/661, 684
See application file for complete search history.

(56) References Cited

U.S. PATENT DOCUMENTS

| | | |
|---|---|---|
| 5,305,435 A | 4/1994 | Bronson |
| 5,570,109 A | 10/1996 | Jenson |
| (Continued) | | |

FOREIGN PATENT DOCUMENTS

| | | |
|---|---|---|
| CN | 1834887 | 9/2006 |
| CN | 101692194 | 4/2010 |
| (Continued) | | |

OTHER PUBLICATIONS

Evernote Corporation, http://www.evernote.com/peek/, Retrieved Aug. 27, 2012, 5 pages.

(Continued)

*Primary Examiner* — Amy Ng
*Assistant Examiner* — Meseker Takele
(74) *Attorney, Agent, or Firm* — Fish & Richardson P.C.

(57) ABSTRACT

A method includes displaying information associated with a first application on a touch-sensitive display of an electronic device. A gesture is detected on the touch-sensitive display, which gesture indicates a request to display information associated with a second application. At least part of the information associated with the second application is displayed without opening the second application.

30 Claims, 7 Drawing Sheets

(56) References Cited

U.S. PATENT DOCUMENTS

| | | |
|---|---|---|
| 5,651,107 A | 7/1997 | Frank et al. |
| 5,668,960 A | 9/1997 | Kataoka |
| 6,073,109 A | 6/2000 | Flores et al. |
| 6,133,898 A | 10/2000 | Ludolph |
| 6,333,973 B1 | 12/2001 | Smith et al. |
| 6,584,181 B1 | 6/2003 | Aktas et al. |
| 7,079,160 B2 | 7/2006 | Colavin |
| 7,250,955 B1 | 7/2007 | Beeman et al. |
| 7,283,808 B2 | 10/2007 | Castell et al. |
| 7,308,653 B2 | 12/2007 | Lin-Hendel |
| 7,370,284 B2 | 5/2008 | Andrea et al. |
| 7,385,875 B2 | 6/2008 | May et al. |
| 7,430,409 B2 | 9/2008 | Klassen et al. |
| 7,484,213 B2 | 1/2009 | Mathew et al. |
| 7,539,945 B2 | 5/2009 | Conrad et al. |
| 7,642,901 B2 | 1/2010 | Kato et al. |
| 7,647,559 B2 | 1/2010 | Yozell-Epstein et al. |
| 7,752,279 B2 | 7/2010 | Hardy et al. |
| 7,774,418 B2 | 8/2010 | Tang et al. |
| 7,782,307 B2 | 8/2010 | Westerman et al. |
| 7,802,206 B1 | 9/2010 | Davis et al. |
| 7,809,162 B2 | 10/2010 | Steinberg et al. |
| 7,812,828 B2 | 10/2010 | Westerman et al. |
| 7,812,860 B2 | 10/2010 | King et al. |
| 7,826,641 B2 | 11/2010 | Mandella et al. |
| 7,844,076 B2 | 11/2010 | Corcoran et al. |
| 7,844,915 B2 | 11/2010 | Platzer et al. |
| 7,848,549 B2 | 12/2010 | Steinberg et al. |
| 7,860,274 B2 | 12/2010 | Steinberg et al. |
| 7,861,169 B2 | 12/2010 | Hull et al. |
| 7,884,846 B2 | 2/2011 | Ferren et al. |
| 7,899,915 B2 | 3/2011 | Reisman |
| 7,900,074 B2 | 3/2011 | Reece et al. |
| 7,904,828 B2 | 3/2011 | Conrad et al. |
| 7,937,672 B2 | 5/2011 | Casto |
| 7,996,045 B1 | 8/2011 | Bauer et al. |
| 8,032,482 B2 | 10/2011 | Rosenberg et al. |
| 8,032,597 B2 | 10/2011 | Khoo |
| 8,082,518 B2 | 12/2011 | Flake et al. |
| 8,099,681 B2 | 1/2012 | Flanagan et al. |
| 8,122,364 B2 | 2/2012 | Yozell-Epstein et al. |
| 8,134,727 B1 | 3/2012 | Shmunis et al. |
| 8,140,115 B1 * | 3/2012 | Kahn et al. ............... 455/556.1 |
| 8,140,975 B2 | 3/2012 | Lemay et al. |
| 8,176,411 B2 | 5/2012 | Palmieri |
| 8,224,391 B2 | 7/2012 | Kim et al. |
| 8,237,664 B2 | 8/2012 | Swanbufg et al. |
| 8,239,785 B2 | 8/2012 | Hinckley et al. |
| 8,249,664 B1 | 8/2012 | Bauer et al. |
| 8,253,695 B2 | 8/2012 | Ganatra et al. |
| 8,261,213 B2 | 9/2012 | Hinckley et al. |
| 8,271,660 B2 | 9/2012 | Schulzrinne et al. |
| 8,271,907 B2 | 9/2012 | Kim et al. |
| 8,280,962 B2 | 10/2012 | Muniz et al. |
| 8,291,344 B2 * | 10/2012 | Chaudhri ...................... 715/838 |
| 8,296,332 B2 | 10/2012 | Boley et al. |
| 8,300,005 B2 | 10/2012 | Tateuchi et al. |
| 8,301,701 B2 | 10/2012 | Goodman et al. |
| 8,356,256 B2 | 1/2013 | Olsen |
| 8,359,017 B2 | 1/2013 | Bruchelt |
| 8,359,335 B2 | 1/2013 | Coker et al. |
| 8,392,837 B2 * | 3/2013 | Li ................................ 715/747 |
| 8,402,384 B2 | 3/2013 | Scott |
| 8,453,057 B2 | 5/2013 | Stallings et al. |
| 8,473,843 B2 | 6/2013 | Lundy et al. |
| 8,473,870 B2 | 6/2013 | Hinckley et al. |
| 8,479,122 B2 | 7/2013 | Hotelling et al. |
| 8,510,677 B2 | 8/2013 | van Os |
| 8,539,384 B2 | 9/2013 | Hinckley et al. |
| 8,650,501 B2 | 2/2014 | Arnold et al. |
| 8,681,112 B2 | 3/2014 | Singhal |
| 8,689,146 B2 | 4/2014 | Lazaridis et al. |
| 8,711,416 B1 | 4/2014 | Byer et al. |
| 8,726,198 B2 | 5/2014 | Rydenhag et al. |
| 8,745,141 B2 | 6/2014 | Rosenberg et al. |
| 2001/0028365 A1 | 10/2001 | Ludolph |
| 2002/0098831 A1 | 7/2002 | Castell et al. |
| 2002/0126155 A1 | 9/2002 | Lin-Hendel |
| 2003/0070000 A1 | 4/2003 | Coker et al. |
| 2004/0068545 A1 | 4/2004 | Daniell et al. |
| 2004/0117451 A1 | 6/2004 | Chung |
| 2004/0128353 A1 | 7/2004 | Goodman et al. |
| 2004/0196259 A1 | 10/2004 | Bradski |
| 2004/0243677 A1 | 12/2004 | Curbow et al. |
| 2005/0001848 A1 | 1/2005 | Colavin |
| 2005/0108655 A1 | 5/2005 | Andrea et al. |
| 2006/0026521 A1 | 2/2006 | Hotelling et al. |
| 2006/0075046 A1 | 4/2006 | Yozell-Epstein et al. |
| 2006/0101350 A1 | 5/2006 | Scott |
| 2006/0123360 A1 | 6/2006 | Anwar et al. |
| 2006/0156240 A1 | 7/2006 | Lemay et al. |
| 2006/0190833 A1 | 8/2006 | Sangiovanni et al. |
| 2006/0250377 A1 | 11/2006 | Zadesky et al. |
| 2006/0256082 A1 | 11/2006 | Cho et al. |
| 2006/0270461 A1 | 11/2006 | Won et al. |
| 2006/0284852 A1 | 12/2006 | Hofmeister et al. |
| 2007/0011258 A1 | 1/2007 | Khoo |
| 2007/0016958 A1 | 1/2007 | Bodepudi et al. |
| 2007/0038718 A1 | 2/2007 | Khoo et al. |
| 2007/0083600 A1 | 4/2007 | Bakos et al. |
| 2007/0106939 A1 | 5/2007 | Qassoudi |
| 2007/0139372 A1 | 6/2007 | Swanburg et al. |
| 2007/0150842 A1 | 6/2007 | Chaudhri et al. |
| 2007/0152977 A1 | 7/2007 | Ng et al. |
| 2007/0220444 A1 | 9/2007 | Sunday et al. |
| 2007/0229466 A1 | 10/2007 | Peng et al. |
| 2007/0236468 A1 | 10/2007 | Tuli |
| 2007/0256035 A1 | 11/2007 | Matsuzawa et al. |
| 2007/0271376 A1 | 11/2007 | Yach |
| 2008/0005247 A9 | 1/2008 | Khoo |
| 2008/0008163 A1 | 1/2008 | Castell et al. |
| 2008/0034047 A1 | 2/2008 | Rosenberg et al. |
| 2008/0046824 A1 | 2/2008 | Li et al. |
| 2008/0065758 A1 | 3/2008 | Narayanaswami |
| 2008/0094369 A1 | 4/2008 | Ganatra et al. |
| 2008/0165151 A1 | 7/2008 | Lemay et al. |
| 2008/0165160 A1 | 7/2008 | Kocienda |
| 2008/0174570 A1 | 7/2008 | Jobs et al. |
| 2008/0189622 A1 | 8/2008 | Sanchez et al. |
| 2008/0220747 A1 | 9/2008 | Ashkenazi et al. |
| 2008/0231601 A1 | 9/2008 | Fyke et al. |
| 2008/0261569 A1 | 10/2008 | Britt et al. |
| 2008/0272927 A1 | 11/2008 | Woolley et al. |
| 2008/0273014 A1 | 11/2008 | Lowles et al. |
| 2009/0006991 A1 | 1/2009 | Lindberg et al. |
| 2009/0007017 A1 | 1/2009 | Anzures et al. |
| 2009/0013282 A1 | 1/2009 | Mercer |
| 2009/0027337 A1 | 1/2009 | Hildreth |
| 2009/0049407 A1 | 2/2009 | Casto |
| 2009/0064055 A1 | 3/2009 | Chaudhri et al. |
| 2009/0094562 A1 | 4/2009 | Jeong et al. |
| 2009/0119678 A1 | 5/2009 | Shih et al. |
| 2009/0144661 A1 | 6/2009 | Nakajima et al. |
| 2009/0174679 A1 | 7/2009 | Westerman |
| 2009/0177754 A1 | 7/2009 | Brezina et al. |
| 2009/0178006 A1 | 7/2009 | Lemay et al. |
| 2009/0195518 A1 | 8/2009 | Mattice et al. |
| 2009/0199130 A1 | 8/2009 | Tsern et al. |
| 2009/0237367 A1 | 9/2009 | Ryu et al. |
| 2009/0241072 A1 | 9/2009 | Chaudhri et al. |
| 2009/0249247 A1 * | 10/2009 | Tseng et al. ................... 715/808 |
| 2009/0252312 A1 | 10/2009 | Muniz et al. |
| 2009/0267909 A1 | 10/2009 | Chen et al. |
| 2009/0273583 A1 | 11/2009 | Norhammar |
| 2009/0278806 A1 * | 11/2009 | Duarte et al. ................. 345/173 |
| 2009/0292690 A1 | 11/2009 | Culbert |
| 2009/0295753 A1 | 12/2009 | King et al. |
| 2009/0307631 A1 | 12/2009 | Kim et al. |
| 2009/0307710 A1 | 12/2009 | Zarzycki et al. |
| 2010/0011304 A1 | 1/2010 | Van Os |
| 2010/0013728 A1 | 1/2010 | Harak et al. |
| 2010/0017695 A1 | 1/2010 | Palmieri |
| 2010/0042954 A1 * | 2/2010 | Rosenblatt et al. .......... 715/863 |
| 2010/0050076 A1 | 2/2010 | Roth |

(56) References Cited

U.S. PATENT DOCUMENTS

| | | |
|---|---|---|
| 2010/0058226 A1 | 3/2010 | Flake et al. |
| 2010/0060586 A1* | 3/2010 | Pisula et al. ............... 345/169 |
| 2010/0066698 A1 | 3/2010 | Seo |
| 2010/0079392 A1 | 4/2010 | Chiang et al. |
| 2010/0095224 A1 | 4/2010 | Yozell-Epstein et al. |
| 2010/0095239 A1 | 4/2010 | McCommons et al. |
| 2010/0107067 A1 | 4/2010 | Vaisanen |
| 2010/0153951 A1 | 6/2010 | Jones |
| 2010/0156656 A1 | 6/2010 | Duarte et al. |
| 2010/0162180 A1 | 6/2010 | Dunnam et al. |
| 2010/0169722 A1 | 7/2010 | Wu et al. |
| 2010/0171753 A1 | 7/2010 | Kwon |
| 2010/0175018 A1 | 7/2010 | Petschnigg et al. |
| 2010/0182248 A1 | 7/2010 | Chun |
| 2010/0185989 A1* | 7/2010 | Shiplacoff et al. ........... 715/856 |
| 2010/0214234 A1 | 8/2010 | Singhal |
| 2010/0214237 A1 | 8/2010 | Echeverri et al. |
| 2010/0218130 A1 | 8/2010 | Conrad et al. |
| 2010/0231533 A1 | 9/2010 | Chaudhri |
| 2010/0235794 A1 | 9/2010 | Ording |
| 2010/0248689 A1 | 9/2010 | Teng et al. |
| 2010/0251178 A1 | 9/2010 | Lee et al. |
| 2010/0289760 A1 | 11/2010 | Jonoshita et al. |
| 2010/0295772 A1 | 11/2010 | Alameh et al. |
| 2010/0302172 A1 | 12/2010 | Wilairat |
| 2010/0306693 A1 | 12/2010 | Brinda |
| 2010/0306705 A1 | 12/2010 | Nilsson |
| 2010/0317408 A1 | 12/2010 | Ferren et al. |
| 2011/0029927 A1 | 2/2011 | Lietzke et al. |
| 2011/0034208 A1 | 2/2011 | Gu et al. |
| 2011/0061021 A1 | 3/2011 | Kang et al. |
| 2011/0083111 A1 | 4/2011 | Forutanpour et al. |
| 2011/0099490 A1 | 4/2011 | Barraclough et al. |
| 2011/0112771 A1 | 5/2011 | French |
| 2011/0163944 A1 | 7/2011 | Bilbrey et al. |
| 2011/0163970 A1 | 7/2011 | Lemay |
| 2011/0163989 A1 | 7/2011 | Singhal |
| 2011/0167369 A1 | 7/2011 | Van Os |
| 2011/0175748 A1 | 7/2011 | Small et al. |
| 2011/0175839 A1 | 7/2011 | Prabhu |
| 2011/0181526 A1 | 7/2011 | Shaffer et al. |
| 2011/0185318 A1 | 7/2011 | Hinckley et al. |
| 2011/0209088 A1 | 8/2011 | Hinckley et al. |
| 2011/0209097 A1 | 8/2011 | Hinckley et al. |
| 2011/0209104 A1 | 8/2011 | Hinckley et al. |
| 2011/0210983 A1 | 9/2011 | Theimer et al. |
| 2011/0231499 A1 | 9/2011 | Stovicek et al. |
| 2011/0252369 A1 | 10/2011 | Chaudhri |
| 2011/0252381 A1 | 10/2011 | Chaudhri |
| 2011/0256848 A1 | 10/2011 | Bok et al. |
| 2011/0294467 A1 | 12/2011 | Kim et al. |
| 2012/0026194 A1 | 2/2012 | Wagner et al. |
| 2012/0032979 A1 | 2/2012 | Blow et al. |
| 2012/0083260 A1 | 4/2012 | Arriola et al. |
| 2012/0084697 A1 | 4/2012 | Reeves |
| 2012/0084698 A1 | 4/2012 | Sirpal et al. |
| 2012/0090004 A1 | 4/2012 | Jeong |
| 2012/0102437 A1 | 4/2012 | Worley et al. |
| 2012/0105358 A1 | 5/2012 | Momeyer et al. |
| 2012/0110087 A1 | 5/2012 | Culver et al. |
| 2012/0115449 A1 | 5/2012 | Bruchelt |
| 2012/0154303 A1 | 6/2012 | Lazaridis et al. |
| 2012/0159380 A1 | 6/2012 | Kocienda et al. |
| 2012/0173993 A1 | 7/2012 | Chakra et al. |
| 2012/0180001 A1 | 7/2012 | Griffin et al. |
| 2012/0192108 A1 | 7/2012 | Kolb |
| 2012/0206392 A1 | 8/2012 | Ng et al. |
| 2012/0210214 A1 | 8/2012 | Yoo et al. |
| 2012/0218192 A1 | 8/2012 | Lazaridis et al. |
| 2012/0226978 A1 | 9/2012 | Harberts et al. |
| 2012/0236037 A1 | 9/2012 | Lessing et al. |
| 2012/0266082 A1 | 10/2012 | Webber |
| 2012/0280917 A1 | 11/2012 | Toksvig et al. |
| 2012/0284673 A1 | 11/2012 | Lamb et al. |
| 2012/0290946 A1 | 11/2012 | Schrock et al. |
| 2012/0304107 A1 | 11/2012 | Nan et al. |
| 2012/0304108 A1 | 11/2012 | Jarrett |
| 2012/0311444 A1 | 12/2012 | Chaudhri |
| 2012/0326984 A1 | 12/2012 | Ghassabian |
| 2013/0002524 A1 | 1/2013 | Sirpal et al. |
| 2013/0007665 A1 | 1/2013 | Chaudhri et al. |
| 2013/0024820 A1 | 1/2013 | Kirkpatrick |
| 2013/0031515 A1 | 1/2013 | Funabashi et al. |
| 2013/0033477 A1 | 2/2013 | Sirpal et al. |
| 2013/0055170 A1 | 2/2013 | Langlois et al. |
| 2013/0063383 A1 | 3/2013 | Anderssonreimer et al. |
| 2013/0083260 A1 | 4/2013 | Minami |
| 2013/0117689 A1 | 5/2013 | Lessing et al. |
| 2013/0117718 A1 | 5/2013 | Lazaridis et al. |
| 2013/0141371 A1 | 6/2013 | Hallford et al. |
| 2013/0145295 A1 | 6/2013 | Bocking et al. |
| 2013/0159941 A1 | 6/2013 | Langlois et al. |
| 2013/0167066 A1 | 6/2013 | Scott |
| 2013/0185650 A1 | 7/2013 | Gutowitz |
| 2013/0187863 A1 | 7/2013 | Rydenhag et al. |
| 2013/0187869 A1 | 7/2013 | Rydenhag et al. |
| 2013/0191791 A1 | 7/2013 | Rydenhag et al. |
| 2013/0321340 A1 | 12/2013 | Seo et al. |
| 2013/0326401 A1 | 12/2013 | van Os |
| 2013/0326583 A1 | 12/2013 | Freihold et al. |
| 2013/0332886 A1 | 12/2013 | Cranfill et al. |
| 2013/0346906 A1 | 12/2013 | Farago |
| 2014/0011485 A1 | 1/2014 | Forstall et al. |
| 2014/0109020 A1 | 4/2014 | Wielgosz |
| 2014/0111440 A1 | 4/2014 | Garside et al. |

FOREIGN PATENT DOCUMENTS

| | | |
|---|---|---|
| EP | 2015176 A1 | 1/2009 |
| EP | 2045700 A1 | 4/2009 |
| EP | 2068236 A1 | 6/2009 |
| EP | 2109030 | 10/2009 |
| EP | 2383636 A1 | 11/2011 |
| EP | 2458493 A3 | 5/2012 |
| EP | 2485138 A1 | 8/2012 |
| KR | 20080041809 | 5/2008 |
| KR | 10-2009-0036578 A | 4/2009 |
| KR | 10-2009-0126686 | 12/2009 |
| KR | 10-2010-0032660 A | 3/2010 |
| KR | 20100023637 | 3/2010 |
| TW | 201118666 | 6/2011 |
| WO | 2004051451 A3 | 6/2004 |
| WO | 2009097555 A2 | 8/2009 |
| WO | 2009120925 A2 | 10/2009 |
| WO | 2010040670 A1 | 4/2010 |
| WO | 2012097385 A2 | 7/2012 |
| WO | 2012128795 A1 | 9/2012 |

OTHER PUBLICATIONS

International Searching Authority, International Search Report and Written Opinion issued in connection with International application No. PCT/US2011/062892, dated Feb. 7, 2012, 12 pages.

Jim Blackler, QuickCalendar, an application for Android written in Java, http://jimblackler.net/blog/?p=67 [Oct. 18, 2012 6:00:33 PM], Jan. 30, 2009, 6 pages.

Apple, iOS: Understanding Notifications, http://support.apple.com/kb/HT3576[Oct. 18, 2012 6:05:38 PM], last modified Sep. 19, 2012, 3 pages.

Google, Android 2.3 User's Guide, AUG-2.3-103 Android™ mobile technology platform 2.3, Dec. 13, 2010, 380 pages (English Language Version).

Google, Android 2.3 User's Guide, AUG-2.3-103-KO Android™ mobile technology platform 2.3, Dec. 13, 2010, 368 pages (Korean Language Version).

International Searching Authority, International Search Report and Written Opinion issued in connection with International application No. PCT/US2012/026970, dated Feb. 28, 2012, 10 pages.

"User Guide" Samsung Epic 4G, A Galaxy S Phone, Sprint Oct. 8, 2010, pp. 268.

(56) References Cited

OTHER PUBLICATIONS http://www.gigaom.com/2011/10/12/ios-5-notifications-and-notification-center/, Retrieved May 2, 2013, Asch, Josh, "iOS 5: Notifications and Notification Center", Tech News and Analysis, Oct. 12, 2011, four pages.
Korean Intellectual Property Office, Office Action issued in Korean Application No. 10-2013-7020791, dated May 19, 2014, 5 pages.
KR 20090126686 (KT Tech Inc).
Google, Android Users Guide 2.3 (Google, Inc) Dec. 13, 2010, 380 pages—English version.
Office Action issued in Canadian Application No. 2,823,302 on Jun. 12, 2015.
Office Action issued in Korean Application No. 10-2013-7020791, dated Feb. 23, 2015, 7 pages.
Office Action issued in Korean Application No. 10-2013-7020791, dated Dec. 26, 2014, 3 pages.
Office Action issued in Taiwan Application No. 101141045, dated Oct. 2, 2014, 11 pages.
Office Action issued in Chinese Application No. 201180064310.4 on Aug. 4, 2015.
Office Action issued in Chinese Application No. 201180064310.4 on Mar. 18, 2016.
Office Action issued in Indonesian Application No. W0201303069 on Nov. 7, 2016.
Microsoft, "Cross Sliding State enumeration," <http://msdn.microsoft.com.en-us/library/windows/apps/windows.ui.inout.crosslidingstate>, retrieved Sep. 4, 2012, 3 pages.
Levesque et al., "Frictional Widgets: Enhancing Touch Interfaces with Programmable Friction," CHI 2011, May 7-11, 2011, 6 pages.
International Preliminary Report on Patentability in International Application No. PCT/US2011/062892, dated Jul. 10, 2013, 9 pages.
Examiner's Report issued in Canadian Application No. 2,823,302, dated Jun. 12, 2014, 2 pages.
Office Action issued in Canadian Application No. 2823302 on May 20, 2016.
Communication pursuant to Article 94(3) EPC issued in connection with European Application No. 11794367.0, dated Aug. 14, 2014, 7 pages.
Office Action issued in Korean Application No. 10-2013-7020791, dated Feb. 23, 2015, translation provided.
Office Action issued in Korean Application No. 10-2013-7020791, dated Dec. 26, 2014, 3 pages, translation provided.
Office Action issued in connection with Taiwan Application No. 101141045, dated Oct. 2, 2014, 11 pages, in Chinese language (no translation available).
Office Action issued in Chinese Application No. 201180064310.4 on Aug. 4, 2015, translation provided.
Office Action issued in Chinese Application No. 201180064310.4 on Mar. 18, 2016, translation provided.
Office Action issued in Indonesian Application No. W0201303069 on Nov. 7, 2016, translation provided.

\* cited by examiner

ELECTRONIC DEVICE AND METHOD OF DISPLAYING INFORMATION IN RESPONSE TO A GESTURE

CROSS REFERENCE TO RELATED APPLICATIONS

This patent application is a continuation of and claims priority to U.S. patent application Ser. No. 13/309,227, filed on Dec. 1, 2011, titled "ELECTRONIC DEVICE AND METHOD OF DISPLAYING INFORMATION IN RESPONSE TO A GESTURE," which application is a continuation-in-part of and claims priority to U.S. patent application Ser. No. 13/036,186, filed on Feb. 28, 2011, titled "ELECTRONIC DEVICE AND METHOD OF DISPLAYING INFORMATION IN RESPONSE TO INPUT" and is a continuation-in-part of and claims priority to U.S. patent application Ser. No. 12/985,600, filed on Jan. 6, 2011, titled "ELECTRONIC DEVICE AND METHOD OF CONTROLLING SAME," the contents of which applications are incorporated herein by reference in their entirety.

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touchscreen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
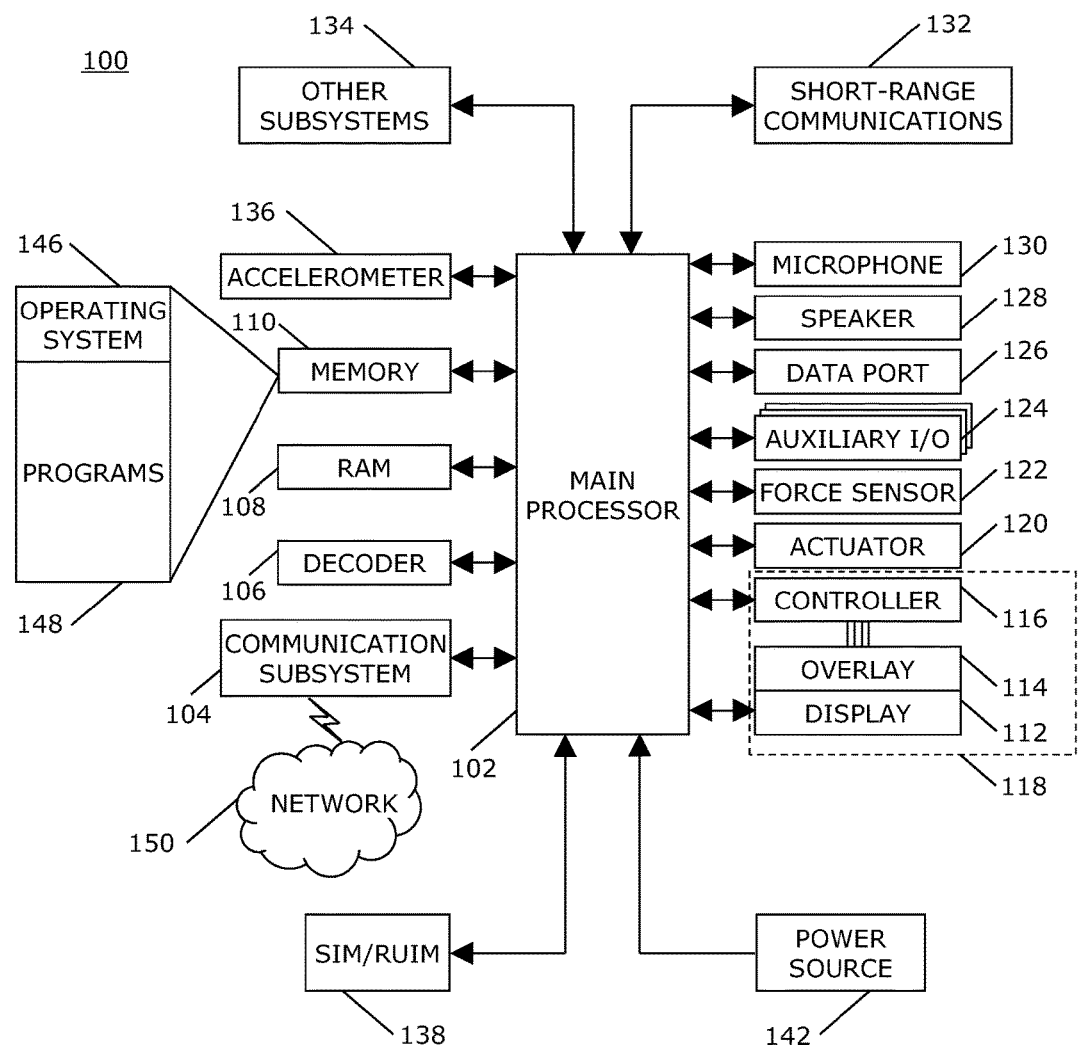
FIG. 1 is a block diagram of an electronic device such as a portable electronic device in accordance with the disclosure.

The following describes an apparatus for and method of controlling display of information for two applications. A gesture detected during display of information associated with a first application requests display of information associated with a second application. The information associated with the second application may be previewed without opening or launching the second application. Optionally, the application may be opened. A single continuous gesture may control the amount of the second application information that is displayed, as well as optionally opening the second application.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device or non-portable electronic device. Examples of portable electronic devices include mobile, or handheld, wireless communication devices such as pagers, cellular phones, cellular smartphones, wireless organizers, personal digital assistants, wirelessly enabled notebook computers, tablet computers, mobile internet devices, electronic navigation devices, and so forth. The portable electronic device may be a portable electronic device without wireless communication capabilities, such as handheld electronic games, digital photograph albums, digital cameras, media players, e-book readers, and so forth. Examples of non portable electronic devices include desktop computers, electronic white boards, smart boards utilized for collaboration, built-in monitors or displays in furniture or appliances, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably coupled to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. Input via a graphical user interface is provided via the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A touch may be detected from any suitable input member, such as a finger, thumb, appendage, or other objects, for example, a stylus, pen, or other pointer, based on the nature of the touch-sensitive display 118. Multiple simultaneous touches may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time. The gesture may be a two dimensional gesture, such as a gesture detected by a touch-sensitive input device, e.g., a touch-sensitive display, a trackpad, an optical joystick, a trackball, and so forth. The gesture may be a three-dimensional gesture, which may be detected by one or more of a camera, a proximity sensor, an optical sensor, and so forth.

The actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the portable electronic device, i.e., the touch-sensitive display 118 may not be fastened to the housing. A mechanical dome switch actuator may be utilized. In this example, tactile feedback is provided when the dome collapses due to imparted force and when the dome returns to the rest position after release of the switch. Alternatively, the actuator 120 may comprise one or more piezoelectric (piezo) devices that provide tactile feedback for the touch-sensitive display 118.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
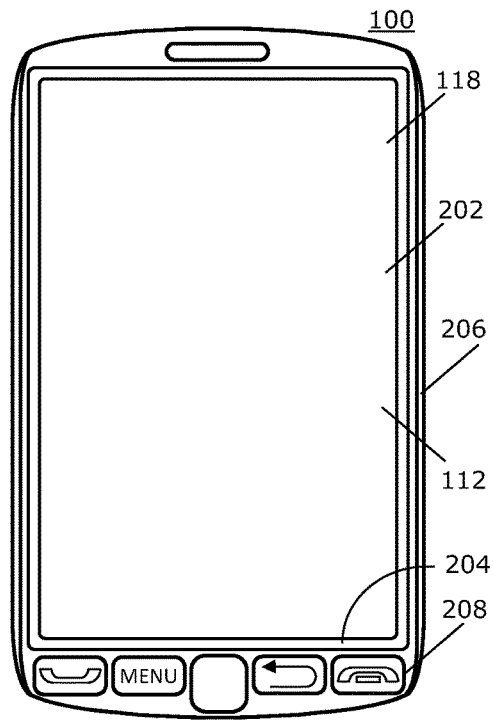
FIG. 2 is a front view of a portable electronic device in accordance with the disclosure.

A front view of a portable electronic device is shown in FIG. 2. The touch-sensitive display 118 includes a display area 202 in which information may be displayed, and a non-display area 204 extending around the periphery of the display area. The display area 202 generally corresponds to the area of the display 112. Information is not displayed in the non-display area 204 by the display 112, which non-display area 204 is utilized to accommodate, for example, electronic traces or electrical connections, adhesives or other sealants, and/or protective coatings around the edges of the display area. The non-display area 204 may be referred to as an inactive area. The non-display area 204 is typically not part of the physical housing or frame 206 of the electronic device. Typically, no pixels of the display 112 are in the non-display area 204, thus no image can be displayed by the display 112 in the non-display area 204. Optionally, a secondary display, not part of the primary display 112, may be disposed under the non-display area 204. Touch sensors may be disposed in the non-display area 204, which touch sensors may be extended from the touch sensors in the display area or distinct or separate touch sensors from the touch sensors in the display area 202. A touch, including a gesture, may be associated with the display area 202, the non-display area 204, or both areas. The touch sensors may extend across substantially the entire non-display area 204 or may be disposed in only part of the non-display area 204. Touches may be detected, for example, starting in the non-display area 204 and continuing into the display area 202 or starting in the display area 202 and continuing into the non-display area 204, whether or not touch sensors are disposed in the non-display area 204. The portable electronic device 100 optionally includes a set of convenience keys or buttons 208, 1308 that may be separate physical keys or buttons or virtual keys or buttons.

A sequence of responses to various aspects of a gesture is shown in FIG. 3 through FIG. 10. Previewing second application information with an option to open the second application is described. The electronic device 100 is in a portrait orientation in these examples, although the examples apply to a landscape orientation as well. In this example, a weather application is displayed when a notification occurs. The notification may indicate, for example, an incoming message, such as an email or text message, a missed phone call, a meeting notice, a social networking message, and so forth. The notification may be audible and/or visual. A visual notification may be provided by a separate physical element, e.g., a light emitting diode that blinks, or a displayed notification, such as the virtual notifier 302 that appears as a blinking object on the touch-sensitive display. The notification may be provided for a predetermined period of time or until an action terminates the notification. The notification may optionally activate monitoring for a gesture that indicates a request to display information associated with a second application for which information is not currently being displayed. For example, the monitoring may target detection of a touch at specific locations of the display, such as at or near an edge or side of the display area 202.

Figure 4:
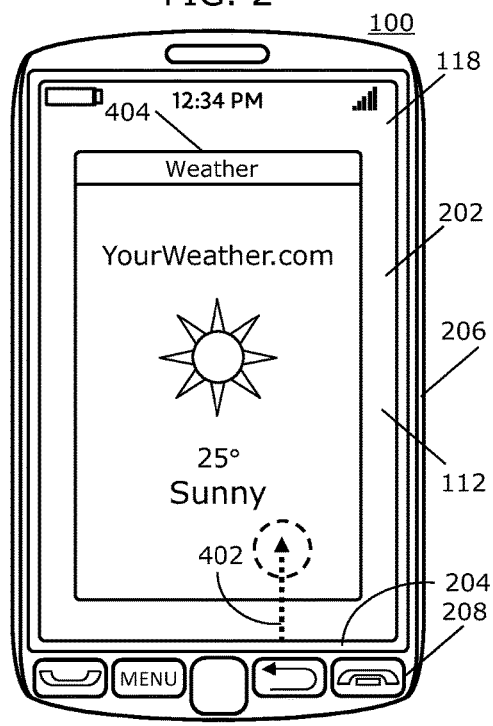

During display of information associated with a first application, the weather application in this example, a gesture is detected. The gesture in this example has an origin associated with a lower edge of the display area 202, e.g., a swipe that starts in the non-display area 204 and continues onto the display area 202 as shown in FIG. 4. Throughout the drawings, a current location of the gesture is shown by a dotted circle, and a path of the gesture is shown by a dotted line with an arrow indicating most recent direction (if any) of the gesture. Information associated with the first application is referred to as first application information, and information associated with the second application is referred to as second application information herein. In this example, the path 402 of the gesture is indicated by the dotted line and arrow. The gesture need not be provided in response to the notification and may be detected at any time.

Figure 5:
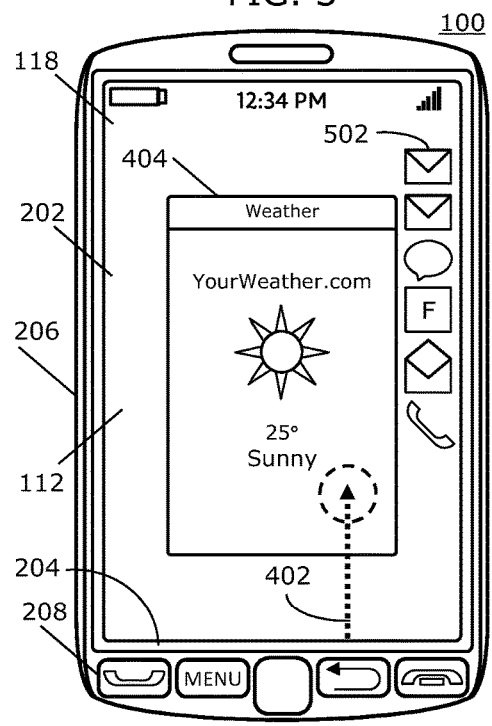

The first application information 404 may optionally be displayed in a background manner, such as in a reduced or gradually reduced size (such as shown in FIG. 4 through FIG. 9, FIG. 14 through FIG. 17, FIG. 19, and FIG. 20), in a partially or gradually transparent style, in a manner that covers or replaces the first application information with the second application information (such as shown in FIG. 7, FIG. 8, FIG. 10, and FIG. 20), in a manner that shifts or scrolls the first application information off the touch-sensitive display 118 (such as shown in FIG. 11, FIG. 15 through FIG. 17, FIG. 19, and FIG. 20) other visual representations, or any combination thereof. The gradual changes in display may optionally take place in response to movement of the gesture or display of the second application information. For example, FIG. 4 and FIG. 5 illustrate that the first application information is reduced in size more as the path 402 of the gesture extends further into the display area 202.

Optionally, additional information may be displayed with the first application information 404 when this information is displayed in a reduced size. For example, a battery level, time, date, signal strength, and one or more message notifications 502 may be displayed, such as shown in FIG. 5. The user may be satisfied with the additional information displayed, and may discontinue the gesture, thus returning the display to displaying the first application information.

Figure 6:
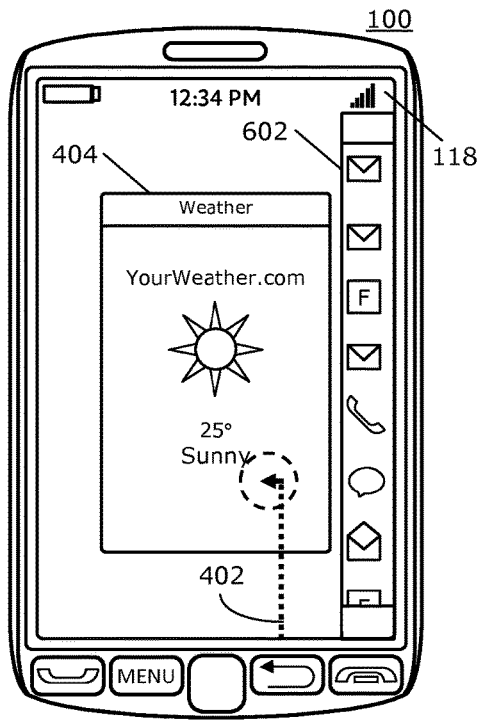
Figure 7:
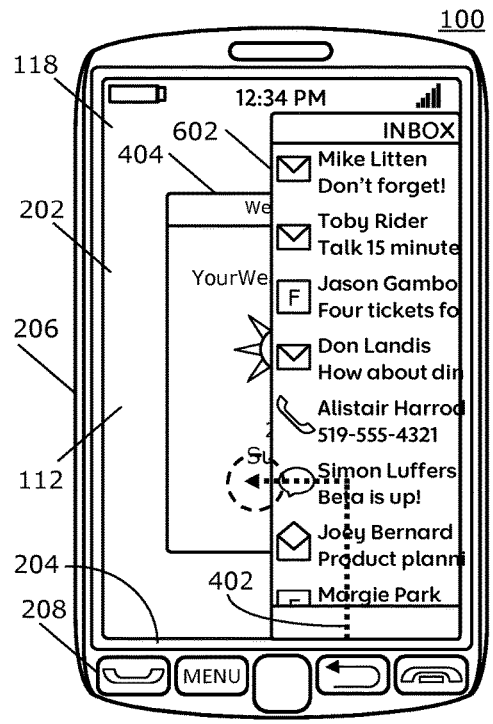
Figure 8:
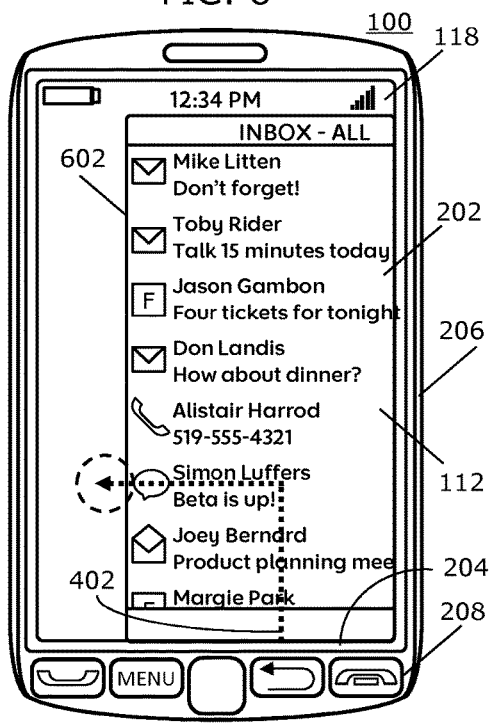

As the gesture continues in the example sequence, the path 402 of the gesture changes direction in FIG. 6, which change in direction triggers the beginning of the display of the second application information 602. In this example sequence, the second application information 602 shifts or scrolls onto the touch-sensitive display 118 from a right side or edge of the display 118 relative to the orientation of the drawing. Thus, the second application information 602 shifts or scrolls onto the display 118 from a side or edge of the display 118 different from the edge associated with the gesture, e.g., where the gesture originated.

Optionally, the second application information 602 is gradually shifted or scrolled onto or off (of) the display 118 along with the movement of the gesture. As the path 402 of the gesture moves to the left as the example proceeds from FIG. 6 to FIG. 7 to FIG. 8, more of the second application information 602 is gradually displayed. This shifting or scrolling provides a user with the ability to view a part of the second information 602 until the user has seen enough information to decide whether or not to open the second application. The second application information 602 may optionally be displayed more quickly when the gesture moves more quickly. More of the second application information 602 may optionally be displayed as length of the gesture increases, such as shown in the example in the progression of the gesture from FIG. 6 to FIG. 7 to FIG. 8. Thus, the amount of information displayed may optionally be proportional to the length of the path of the gesture or the length of a part of the path of the gesture. More of the second application information 602 may optionally be displayed the longer the gesture is maintained or detected by the touch-sensitive display. Thus, the amount of information displayed may optionally be proportional to the duration or length of time of detection of the gesture.

Figure 9:
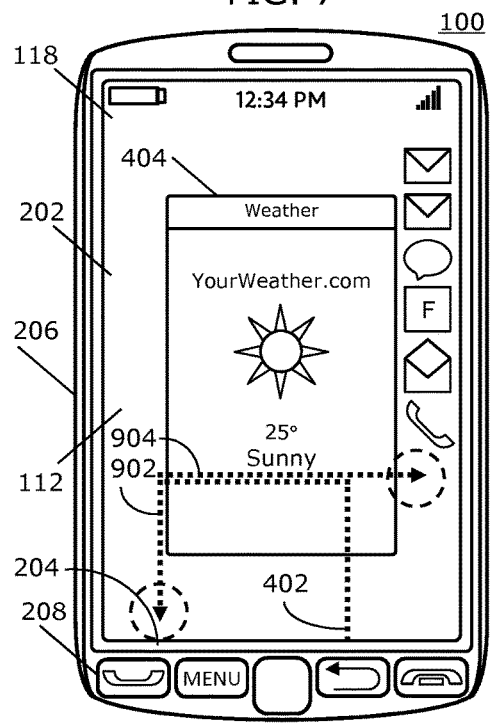

The user is provided with the ability to preview the second application information without opening the application and to optionally open the second application if desired. FIG. 9 illustrates a few different examples of gesture characteristics that terminate the preview of the second application information. For example, the user may have viewed enough information via preview and does not desire to view more information or open the second application. One gesture option to terminate preview includes changing the path 902 of the gesture in a direction toward the edge or side associated with the origin of the gesture, which is the bottom of the display area 202 in this example. Another gesture option to terminate preview includes changing the path 904 of the gesture in a direction toward the edge or side where the second application information began to be displayed, such as the edge where the information shifts or scrolls onto the display area 202. Another gesture option to terminate preview includes simply discontinuing the gesture, e.g., the input member is removed from the touch-sensitive display 118.

Figure 3:
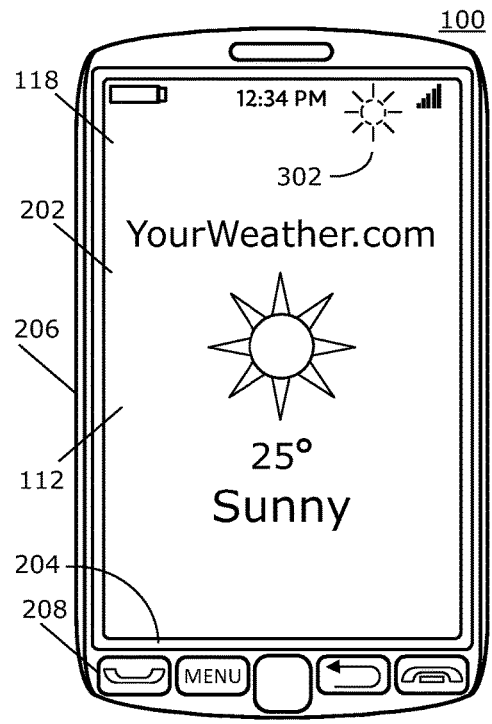
FIG. 3 through FIG. 11 illustrate examples of previewing information on a portable electronic device in accordance with the disclosure.

When the gesture ceases, optionally, the first application information is again displayed on the display 118, as shown in the example of FIG. 9. With this option, the first application information 404 may be displayed in a gradually increasing size, may shift or scroll back onto the display area 202, or may be immediately restored to full or normal display size, such as shown in FIG. 3.

Figure 10:
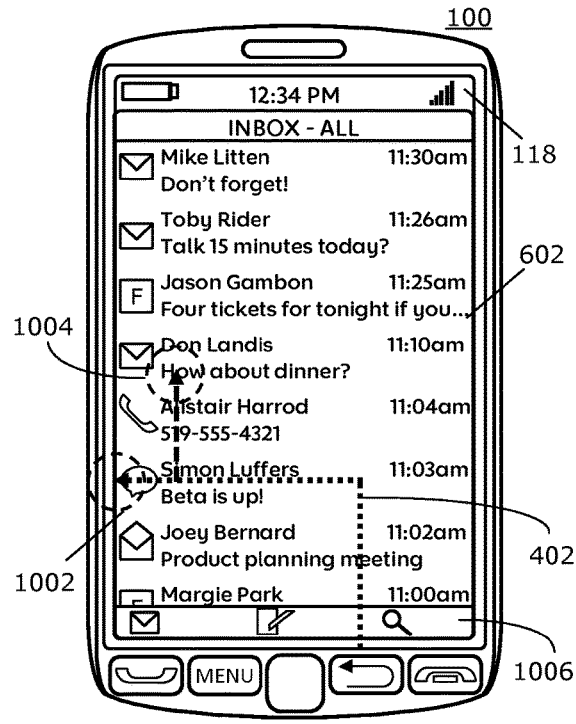

Upon previewing the second application information 602, the user may desire to open the second application, for example, to open or send a message. The second application may be opened when the gesture includes a characteristic that indicates opening of the second application. For example, the path 402 of the gesture may continue from FIG. 8 along the optional paths 1002, 1004 shown in FIG. 10 to open the second application. The paths 1002, 1004 reflect examples of characteristics or attributes of the gesture that are interpreted by the device 100 to open the second application. One option for the gesture to open the second application is for the path 1002 of the gesture to continue in its current direction until the gesture is associated with another edge or side of the display, such as the edge or side opposite the edge or side where the display of the second application information 602 entered the display, such as shown in FIG. 10. Another option for the gesture to open the second application is for the path 1004 of the gesture to change direction, such as toward the edge or side opposite the edge or side where the display of the second application information 602 entered the display, such as shown in FIG. 10. Another option is to automatically open the second application when the second application information covers available display area in response to the gesture, for example, when the second application information is displayed across a vertical or horizontal extent of the display area 202 or a vertical or horizontal extent of a window or field in which the second application information is displayed. A tool bar 1006 may optionally be displayed.

Figure 11:
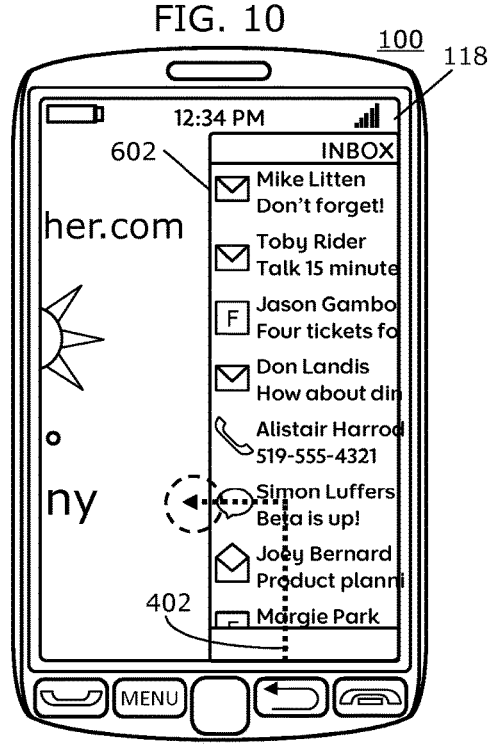

Some of the examples herein show an option where the first application information is displayed in a reduced size. Another option in these examples retains the reduced-size first application information at a fixed location on the display 118 as the second application information covers or replaces the first application information on the display 118. Optionally, the first application information may be displayed without changing the size of the information, i.e., in the same size, such as shown in FIG. 11. When the first application information is displayed same-size, the first application information may be retained at a fixed location on the display 118 as the second application information covers or replaces the first application information on the display 118, or the first application information may be shifted or scrolled off the display 118 as the second application information is shifted or scrolled on the display 118, such as shown in FIG. 11. Less first application information, e.g., quantity of information or area of display covered by the information, may be displayed as more second application information is displayed.

Figure 12:
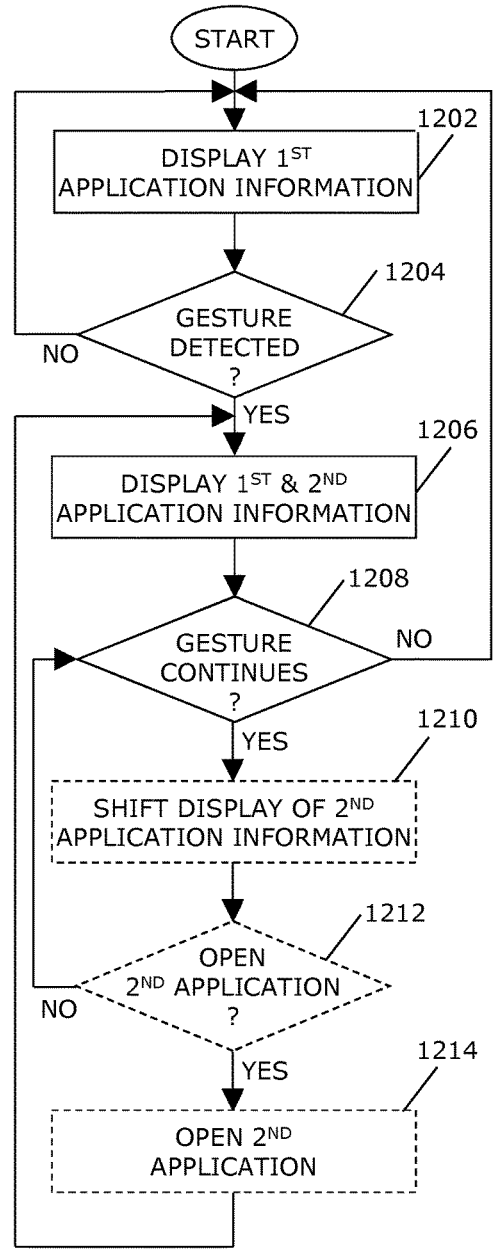
FIG. 12 is a flowchart illustrating a method of controlling display of information for two applications in accordance with the disclosure.

A flowchart illustrating a method of controlling display of information for two applications is shown in FIG. 12. The method may be carried out by software executed, for example, by the processor 102 of the electronic device, which may be a portable electronic device 100. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable medium.

Information associated with a first application is displayed 1202 on a display, for example, on a touch-sensitive display 118. The information may be information associated with any suitable application, such as email, text messaging, calendar, tasks, address book or contacts, media player, or any other suitable application in which information is displayed by or on an electronic device 100. Information associated with email may include a list of email messages, information associated with a calendar may include a meeting schedule, calendar day view, week view, month view, or agenda view, information associated with an address book may include a listing of contacts, information associated with a media player may include text, pictures, videos, or artwork related to music or other media. The applications and information are not limited to the examples provided.

A gesture associated that indicates a request to display information associated with a second application is detected 1204. Detection of the gesture triggers display of the second application information. The gesture may be considered to be a command associated with the second application, which command requests, controls, or causes at least part of the second application information to be displayed.

An appropriate gesture is advantageously assigned to request display of information associated with a second application. Advantageously, unintentional display of information is avoided. Thus, the gesture is associated with the second application. The gesture may be associated with a specific location, such as an edge (or side) or corner of the touch-sensitive display 118, or a displayed element, such as a special indicator, e.g., a ghosted symbol or word, or a header for an application. The gesture may have detectable attributes or characteristics, such as movement, direction, change in direction, shape, duration, length, force, speed, time associated with a given location as with a hover, number of simultaneous touch locations, number of taps, use in conjunction with a physical key, button, or other input device, and so forth. The gesture may comprise depression of a touch-sensitive display 118 that actuates an actuator 120, such as described above. The gesture may comprise any combination of the above characteristics or attributes.

Figure 20:
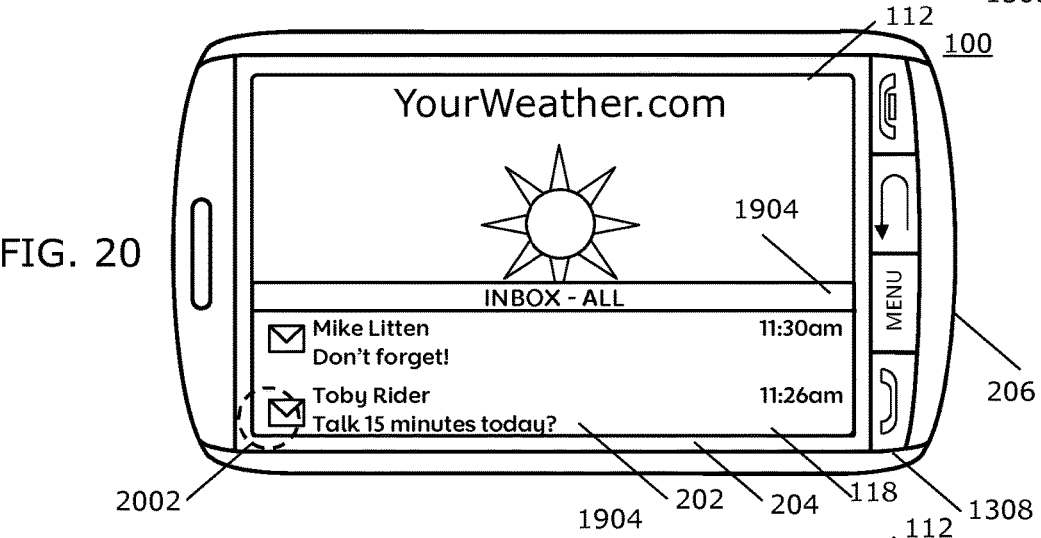
Figure 21:
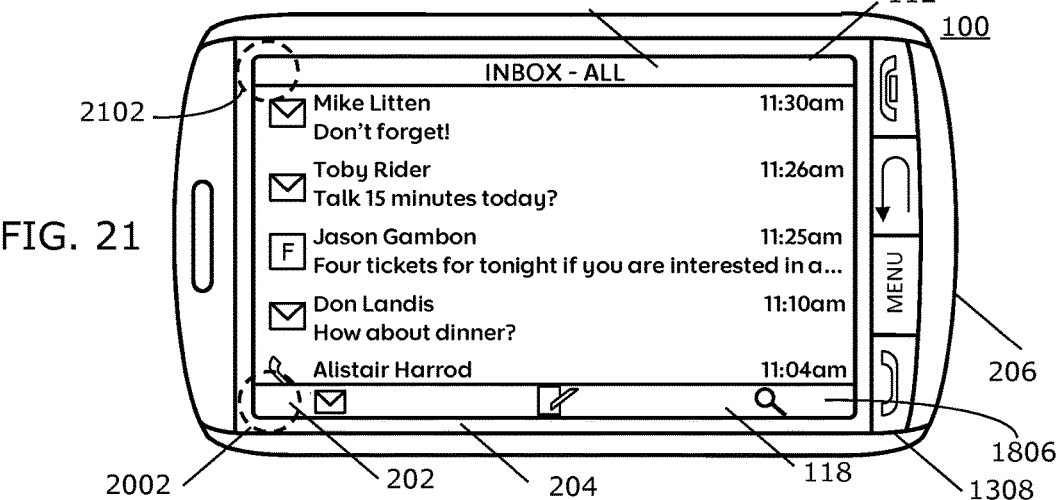

A few examples of a gesture are as follows. The gesture may be associated with an edge or side of the display area 202 and extends into or enters the display area 202. A gesture associated with an edge or side of the display area 202 may be, for example, a gesture detected by touch sensors in the non-display area 204, a gesture that starts outside the display area 202 and continues onto the display area, a gesture having a touch location (e.g., an origin of the gesture) that is at or near an outer perimeter of the display area 202, and so forth. A corner of the display area 202 may be associated with one or both edges or sides that meet at the corner. The gesture may be a hover or other gesture that remains associated with a specific location for a period of time, such as the sustained touch at a location 2002 associated with a corner of the touch-sensitive display 118 as shown in the example of FIGS. 20 and 21. The input may be a compound gesture, for example, a touch sustained at a specific location, such as a corner or side of the display, while a swipe is detected. The gesture may be input directly via an input device, e.g., a touch-sensitive display, optical joystick, and so forth, and may include other types of gestures such as 3D gestures or physical gestures involving movement of the electronic device 100.

The second application may be any suitable application, such as described above. The second application information associated is also described above. For example, the second application may be a message application, and the second application information that is displayed is the inbox for the messaging application. The inbox may be a universal inbox, which may include any or all of the following, for example, emails, meeting notifications, text messages of any type, missed phone call notifications, social networking messages, system messages, news feed messages, download progress messages, subscribed information messages, and so forth. The second application may alternatively be a calendar, an address book, home screen, and so forth. The second application may alternatively be a notification application that manages notifications of various sorts, including notifications related to email, text, missed phone calls, calendar, social networking, and device warnings, such as low battery or lost communication connection, to name a few.

The first application information and second application information are displayed 1206. For example, the second application information may be displayed in increasing quantity as the first application information is displayed in decreasing quantity. The displayed second application information may be a preview (or peek) of the second application information, including, for example, a subset or part of all the available second application information. For example, when the second application is an email application, the last five emails may be displayed, when the second application is an address book, the ten most often accessed contacts may be displayed, and so forth. The preview may be displayed without opening or launching the second application, in which case the previewed information may be retrieved from stored information and/or information received via a communication network 150. Previewing or displaying without opening the second application is typically a faster process than opening the application.

While previewed, second application information is viewable and active application functions are not operable other than to display more or less of the information. For the example of previewing a messaging inbox, email messages cannot be opened and new emails cannot be initiated during a preview, although the titles, senders, and time information are viewable. For the example of previewing a calendar, existing calendar events cannot be opened and new calendar events cannot be initiated during a preview, although the titles, meeting initiator, and time information are viewable. The second application may optionally be opened to engage active application functions. The preview of the second application information is displayed, for example, for the time duration of the gesture or until the second application is opened.

While the gesture continues 1208, the second application information may optionally be displayed by shifting or scrolling 1210 the information onto or off (of) the touch-sensitive display 118. The shifting optionally occurs in accordance with movement of the gesture. For example, more information may be displayed as the gesture moves in a forward direction and less information may be displayed as the gesture moves in a reverse direction. A forward direction may be, for example, the direction that the information takes as it progresses onto the display 118, and the reverse direction is the opposite direction to the forward direction. The shifting or scrolling of the second application information may continue as long as the gesture continues or until the second application is opened 1214 in response to detecting 1212 an indication to open the second application. The first application information may optionally shift or scroll off the display 118 as the second application information scrolls onto the display 118. Similarly, the first application information may optionally shift or scroll onto the display 118 as the second application information scrolls off the display 118. Thus, the method provides a preview of second application information without opening the second application while providing an easily executed option to open the second application.

A sequence of responses to various aspects of gestures is shown in FIG. 13 through FIG. 21. Previewing second application information with an option to open the second application are described. Descriptions of features and aspects described above will not be repeated for the sake of brevity. The electronic device 100 is in a landscape orientation in these examples, although the examples apply to a portrait orientation as well. The portable electronic device 100 in FIG. 13 through FIG. 21 has a different form factor than the form factor of the portable electronic device 100 of FIG. 2 through FIG. 11. The method described herein applies to any form factor.

Figure 13:
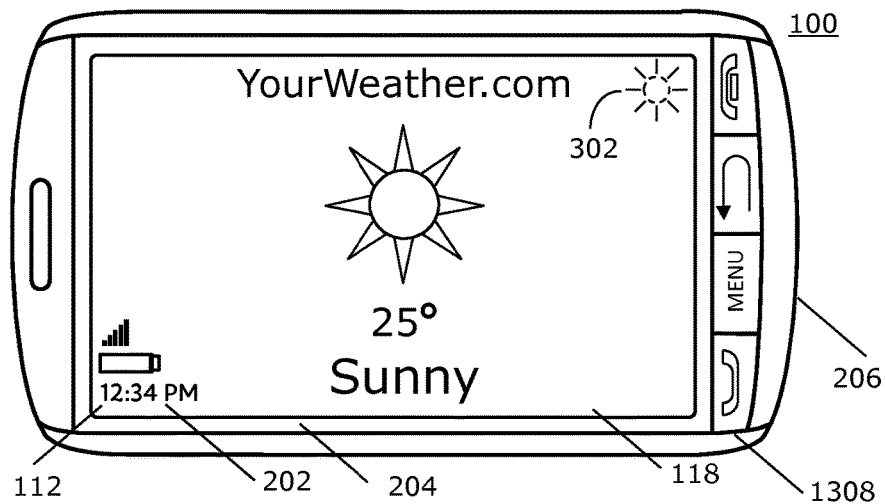
FIG. 13 through FIG. 21 illustrate examples of previewing information on a portable electronic device in accordance with the disclosure.
Figure 14:
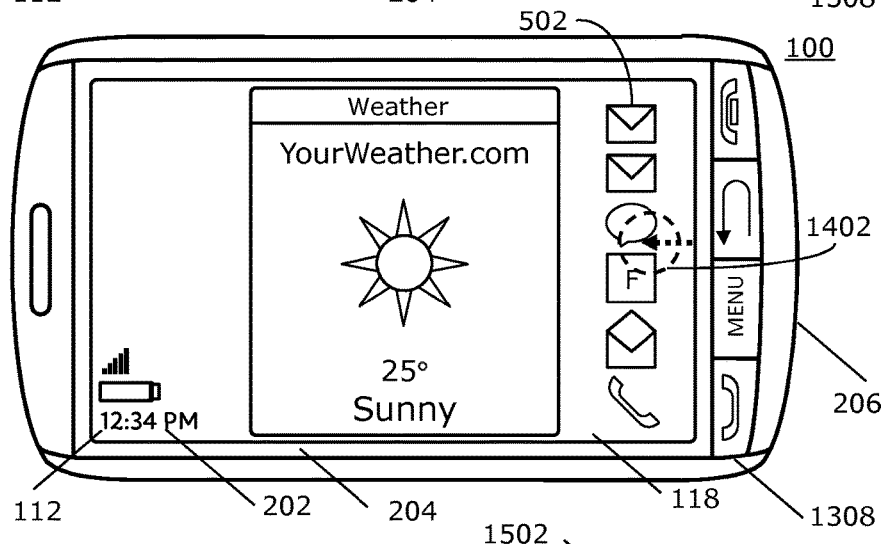

The first application in this example is the same weather application from the above examples, although the information is displayed in a landscape orientation, as shown in FIG. 13. A notification, such as described above, may optionally be provided, such as the virtual notifier 302. The gesture that indicates a request to display information associated with a second application is detected. The gesture in this example has an origin associated with a right edge or side of the display area 202, e.g., a swipe that has a path 1402 that starts in the non-display area 204 and continues onto the display area 202 toward the left as shown in FIG. 14. The gesture need not be provided in response to the notification and may be detected at any time.

Figure 15:
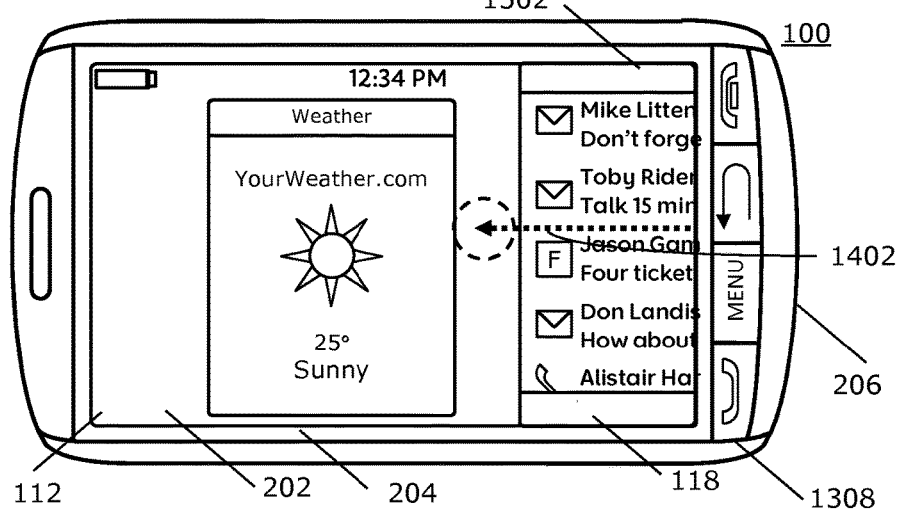

As shown in FIG. 15, the second application information 1502 shifts or scrolls onto the display 118 beginning at the right side or edge of the display 118 when the gesture is detected, which may include a slight delay. In this example, the second application information 1502 scrolls or shifts onto the display 118 from the same edge or side associated with the gesture.

Figure 16:
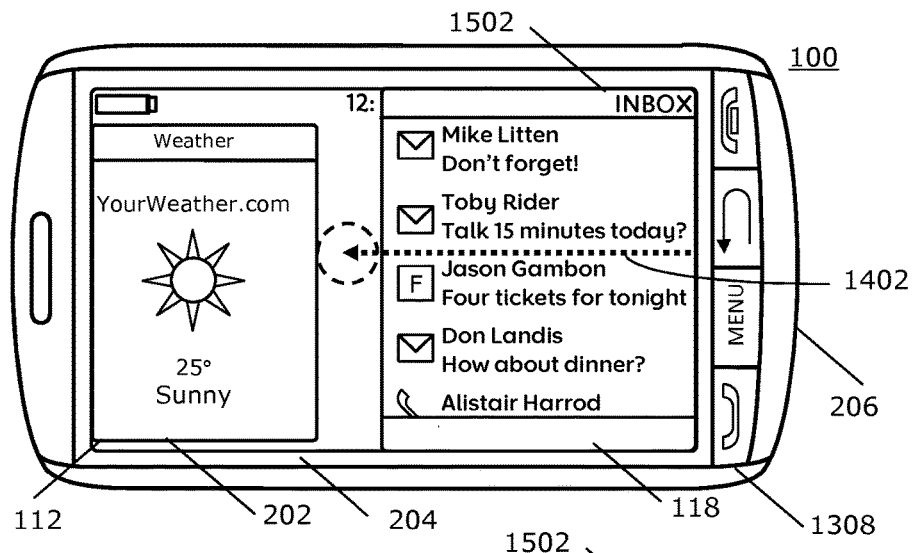
Figure 17:
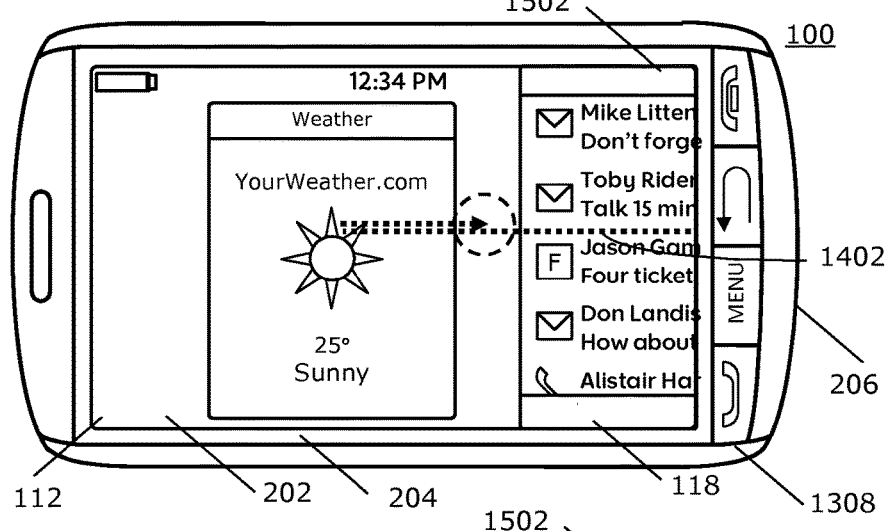
Figure 19:
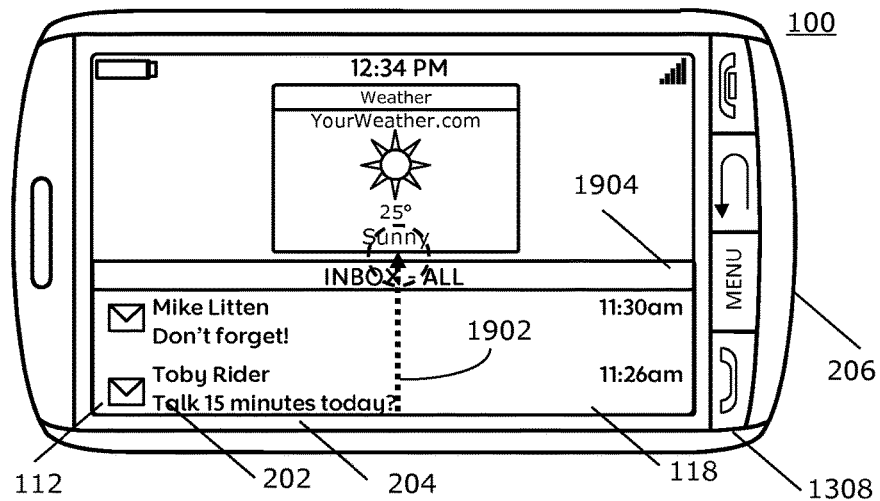

As shown in the progression of path 1402 of the gesture from FIG. 15 to FIG. 16 to FIG. 17, the second application information 1502 shifts or scrolls onto or off (of) the display 118 along with or in accordance with movement of the gesture. For example, when the gesture moves to the left, the information moves proportionately to the left; when the gesture moves to the right, the information moves proportionately to the right. Similarly, when the gesture moves up or down, the information moves proportionately up or down, respectively, such as shown in the example of FIG. 19. As described above, the first application information may shrink or shift or scroll off the display 118 as the second application information shifts or scrolls onto the display 118.

Figure 18:
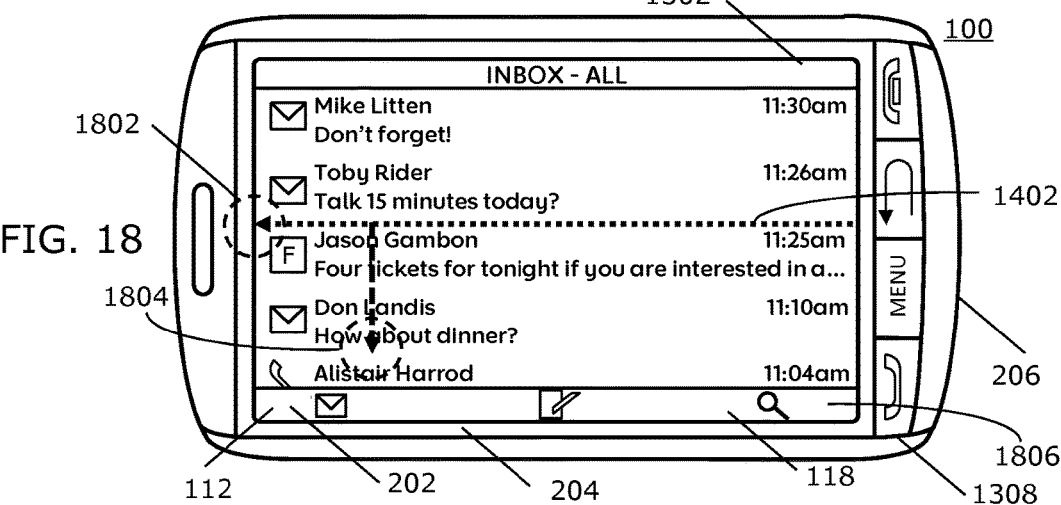

The preview or display of the second application information 1502 may end as described above, e.g., upon cessation of the gesture, when the second application information 1502 is scrolled or shifted off the display 118, and so forth. The preview terminates when the second application is opened or launched. As before, upon previewing the second application information 1502, the user may desire to open the second application, for example, to open or send a message. The second application may be opened when the gesture includes a characteristic that indicates opening of the second application. For example, the path 1402 of the gesture may continue along the optional paths 1802, 1804 shown in FIG. 18 to open the second application. The paths 1802, 1804 reflect examples of characteristics or attributes of the gesture that are interpreted by the device 100 to open the second application. One option for the gesture to open the second application is for the path 1802 of the gesture to continue in its current direction until the gesture is associated with another edge or side of the display, such as the edge or side opposite the edge or side where the display of the second application information 1502 entered the display, such as shown in FIG. 18. Another option for the gesture to open the second application is for the path 1804 of the gesture to change direction, such as toward the edge or side opposite the edge or side where the display of the second application information 602 entered the display, such as shown in FIG. 18. Another option is to automatically open the second application when the second application information covers available display area in response to the gesture, for example, when the second application information is displayed across a vertical or horizontal extent of the display area 202 or a vertical or horizontal extent of a window or field in which the second application information is displayed. A tool bar 1806 may optionally be displayed.

Second application information may scroll or shift onto the display 118 from a different edge or side, such as the bottom of the display area 202, such as shown in FIG. 19. In this example, the gesture is associated with the same edge from which the scrolling or shifting begins, although the gesture may originate from any edge or side or corner.

Different gesture types other than moving gestures may be utilized to preview the second application information. As shown in the example of FIG. 20 and FIG. 21, a gesture comprising a stationary touch or hover at a location 2002 associated with one of the corners of the display area 202 initiates the preview, which continues as described above. An icon may optionally be displayed at the location 2002. More of the second application information 1904 may optionally be displayed the longer the gesture is maintained or detected by the touch-sensitive display 118 at the location 2002. In the example of FIG. 20, the first application information is displayed same-size, and the first application information is retained at a fixed location on the display 118 as the second application information covers or replaces the first application information on the display 118. The preview may terminate, for example, when the gesture ceases to be detected or moves to a substantially different location. The second application may be opened, for example, when a second touch is detected at a location 2102 associated with a different corner, such as shown in FIG. 21.

When preview is terminated, display of the second application information may optionally be shifted off or scrolled off the display 118 along with movement of the gesture or over a period of time. The second application information may recede in the direction in which the information was displayed or may continue off the opposite edge of the display area 202 from which display began. Optionally, the display of the second application information may be immediately terminated or faded gradually off the display.

In the above examples, the gesture is a continuous gesture while displaying at least part of the second application information without opening the second application. Although other non-continuous gestures may be utilized, a continuous gesture facilitates a more smooth display of the information as well as more quickly changing what is displayed as well as the end of the display of the second application information. The user is provided with the ability to preview as much second application information as desired without opening the second application, with the option to quickly and easily open the second application at any time with the same gesture utilized to preview the second application information. The method described herein is a natural and efficient method for previewing information with an option to open the application. Because previewing is typically faster than opening the second application, battery is conserved as well as providing a more efficient interface to the user because the user is able to obtain information without being required to open the second application.

Although the second application is opened in the above examples with a continuation of the gesture, other input may be utilized to open the second application, such as a second gesture that overlaps in time with the original gesture that indicates a preview, a menu selection, depression of a physical key, and so forth.

The second application information is displayed in the above examples starting from the right or the bottom edge or side of the touch-sensitive display 118, which has the advantage of displaying the information in a left-to-right manner or chronologically, respectively. Nevertheless, display of the second application information may start from any edge or side of the display 118.

The above examples describe displaying a first application and previewing second application information without opening the second application, with an option to open the second application in response to detecting a gesture or characteristics of the gesture. Optionally, different gestures or gestures associates with different edges or sides or corners may preview multiple different applications. For example, a gesture associated with the right edge previews a messaging inbox, a gesture associated with the left edge previews a calendar, a gesture associated with the bottom edge previews an address book, and a gesture associated with the top edge previews a user-selected application. The user may be provided with the option to assign the application with the desired edge or side or corner.

Although the method is advantageous for portable electronic devices due to the limited display size on a portable electronic device, such as a smartphone, the method may be applied to other electronic devices that have a larger display size.

Although the above examples illustrate various different features, the features of any example may be utilized with any other example unless the features conflict. For example, features of FIG. 2 through 11 may be utilized in a landscape orientation, and features of FIG. 13 through 21 may be utilized in a portrait orientation. Other features are interchangeable but are too numerous to identify briefly.

Shifting or scrolling of information onto a display area generally includes gradually moving or progressively adding information onto a display area. Shifting or scrolling of information off (of) a display area generally includes gradually moving or progressively removing information from a display area. The shifting or scrolling of second application information onto the display may cause shifting or scrolling of first application information off the display or may cover or replace the first application information, such that the first application information appears to be below the second application information. The display of the information associated with a first application may be reduced as the display of the information associated with the second application is increased. The information associated with the second application may shift onto the touch-sensitive display from a first edge of the touch-sensitive display while the information associated with the first application shifts off a second edge of the touch-sensitive display, wherein the second edge is opposite the first edge. Icons or information other than the first application information may also scroll or shift onto or off of the display as the first application information or the second application information scrolls onto or off of the display, changes size, and so forth.

The second application information that is previewed may be adjusted by the user. For example, the use may identify the quantity of information to be previewed, e.g., 10 latest unread emails, 5 most recently accessed contacts, and so forth.

The terms left, right, top, bottom, and so forth are utilized herein for purpose of providing a perspective for reference but are not otherwise limiting.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
    displaying, in a window, information associated with a first application on a touch-sensitive display of an electronic device;
    detecting, while only the information associated with a first application is displayed in the window, a gesture on the touch-sensitive display, which gesture is a request dedicated to display messaging information;
    in response to detecting the gesture:
        dividing the window into a first area and a second area and
        gradually displaying the messaging information in the first area while reducing display of the information associated with the first application in the second area;
    while the gesture continues to be detected, varying a size of the first area along with movement of the gesture;
    in response to detecting discontinuation of the gesture:
        when a characteristic of the gesture is an indication to view the messaging information, discontinuing display of the information associated with the first application and displaying only the messaging information in the window;
        when a characteristic of the gesture in an indication to terminate display of the messaging information, discontinuing display of the messaging information and displaying only the information associated with the first application in the window.

2. The method of claim 1, wherein at least part of the messaging information is previewed until the gesture terminates or a messaging application is opened.

3. The method of claim 1, wherein a messaging application is opened when the gesture includes a characteristic that indicates opening of the messaging application.

4. The method of claim 3, wherein opening the messaging application comprises engaging active inbox functions.

5. The method of claim 1, wherein gradually displaying the messaging information comprises previewing the messaging information by displaying messaging information while active inbox functions are not operable.

6. The method of claim 1, further comprising, prior to displaying the messaging information across available display area of the touch-sensitive display, discontinuing display of the messaging information in response to detecting a characteristic of the gesture.

7. The method of claim 1, wherein the first area progressively increases in size or decreases in size along with movement of the gesture.

8. The method of claim 1, further comprising reducing display of the messaging information while increasing display of the information associated with the first application when the gesture changes direction.

9. The method of claim 1, wherein a change in direction of the gesture causes the messaging application to begin to be displayed.

10. The method of claim 1, wherein monitoring for the gesture is activated when a notification is activated.

11. The method of claim 1, wherein at least part of the gesture is associated with a first edge of the touch-sensitive display, wherein the messaging information shifts onto the touch-sensitive display from a second edge of the touch-sensitive display, wherein the first edge is different from the second edge.

12. The method of claim 1, wherein at least part of the gesture is associated with a first edge of the touch-sensitive display, wherein the messaging information shifts onto the touch-sensitive display from the first edge.

13. The method of claim 1, wherein the messaging information shifts onto the touch-sensitive display from a first edge of the touch-sensitive display while the information associated with the first application shifts off a second edge of the touch-sensitive display, wherein the second edge is opposite the first edge.

14. The method of claim 1, wherein the messaging information is a universal inbox.

15. A method comprising:
    displaying information associated with a first application on a touch-sensitive display of an electronic device by displaying, in a first area of the touch-sensitive display, the information associated with the first application;
    detecting a gesture on the touch-sensitive display, which gesture indicates a request to preview messaging information;
    in response to detecting the gesture:
        previewing the messaging information by shifting a side of the messaging information into the first area while reducing display of the information associated with the first application in the first area as an area of display of the messaging information increases, wherein the shifting and reducing occurs along with movement of the gesture;

in response to detecting discontinuation of the gesture:
when a characteristic of the gesture in an indication from the gesture to view the messaging information, discontinuing display of the information associated with the first application and displaying the messaging information in the first area;
when a characteristic of the gesture indicates termination of the preview of the messaging information, discontinuing display of the messaging information and displaying the information associated with the first application in the first area.

16. The method of claim 15, wherein at least part of the messaging information is previewed until the gesture terminates or a messaging application is opened.

17. The method of claim 15, wherein a messaging application is opened when the gesture includes a characteristic that indicates opening of the messaging application.

18. The method of claim 15, further comprising gradually shifting the information associated with the first application off the touch-sensitive display to gradually increase an area of display of the messaging information.

19. The method of claim 15, wherein an area of display of the messaging information progressively increases in size or decreases in size along with movement of the gesture.

20. The method of claim 15, wherein the messaging information is displayed by shifting a side of the messaging information across the touch-sensitive display.

21. A method comprising:
while displaying first application information throughout a window displayed on an electronic device, detecting a gesture that requests messaging information to be displayed in the window;
in response to detecting the gesture:
dividing the window into a first area and a second area and
displaying the messaging information in the first area while displaying the first application information in the second area;
while the gesture continues to be detected, varying a size of the first area along with movement of the gesture;
in response to detecting discontinuation of the gesture:
when a characteristic of the gesture is an indication to view the messaging information, discontinuing display of the first application information and displaying the messaging information in the window;
when a characteristic of the gesture is an indication to terminate display of the messaging information, discontinuing display of the messaging information and displaying the first application information in the window.

22. The method of claim 21, wherein at least part of the messaging information is previewed until the gesture terminates or a messaging application is opened.

23. The method of claim 21, wherein a messaging application is opened when the gesture includes a characteristic that indicates opening of the messaging application.

24. The method of claim 21, further comprising gradually shifting the information associated with the first application off the touch-sensitive display to gradually increase an area of display of the messaging information.

25. The method of claim 21, wherein an area of display of the messaging information progressively increases in size or decreases in size along with movement of the gesture.

26. The method of claim 21, wherein the messaging information is displayed by shifting a side of the messaging information across the touch-sensitive display.

27. A method comprising:
displaying information associated with a first application in a window of a touch-sensitive display of an electronic device, wherein only the information associated with the first application is displayed in the window;
detecting a gesture on the touch-sensitive display, which gesture is a dedicated request to preview an inbox;
in response to detecting the gesture:
previewing the inbox by:
shifting the information associated with the first application off a first side of the window;
displaying the inbox from a second side of the window, wherein the second side of the window is opposite the first side of the window;
wherein the shifting is controlled by movement of the gesture, such that the gesture controls a size of an area of the window in which the inbox is displayed;
detecting an indication from the gesture to open the inbox and in response to detecting the indication, displaying the inbox in the window and discontinuing display of the information associated with the first application, wherein the indication comprises movement of the gesture toward the first side of the window;
when a characteristic of the gesture indicates terminating display of the inbox, discontinuing display of the inbox and displaying the information associated with the first application in the window, wherein the characteristic comprises movement of the gesture toward the second side of the window.

28. The method of claim 27, wherein the shifting comprises displaying the information associated with the first application in a reduced size.

29. The method of claim 27, wherein, in response to detecting the gesture, one or more message notifications are displayed with the information associated with the first application.

30. The method of claim 27, wherein the size of the area of the window in which the inbox is displayed progressively increases in size or decreases in size along with movement of the gesture.

* * * * *